(12) United States Patent
De Fontenay et al.

(10) Patent No.: US 6,247,688 B1
(45) Date of Patent: Jun. 19, 2001

(54) VEHICLE WHEEL SUSPENSION DEVICE

(75) Inventors: Etienne De Fontenay, Decize; Philippe Jean, Beaumont, both of (FR)

(73) Assignee: Michelin AVS, Versailles (FR)

( * ) Notice: Subject to any disclaimer, the term of this patent is extended or adjusted under 35 U.S.C. 154(b) by 0 days.

(21) Appl. No.: 09/509,017

(22) PCT Filed: Aug. 10, 1998

(86) PCT No.: PCT/FR98/01779

§ 371 Date: May 15, 2000

§ 102(e) Date: May 15, 2000

(87) PCT Pub. No.: WO99/15351

PCT Pub. Date: Apr. 1, 1999

(51) Int. Cl.[7] .......................... B62D 17/00; B60G 15/06; B60G 17/02
(52) U.S. Cl. ..................... 267/220; 280/124.145
(58) Field of Search ................ 280/124.143, 124.145, 280/124.146, 124.147, 86.752; 267/220

(56) References Cited

U.S. PATENT DOCUMENTS

| 4,817,984 | * | 4/1989 | Ferman et al. | 280/86.752 |
|---|---|---|---|---|
| 4,971,296 | * | 11/1990 | Kondo | 267/220 |
| 5,401,051 | * | 3/1995 | Ivory | 280/124.145 |
| 5,484,161 | * | 1/1996 | McIntyre | 267/220 |

FOREIGN PATENT DOCUMENTS

| 31 36 954 A1 | 3/1983 | (DE) . |
|---|---|---|
| 37 13 699 A1 | 11/1987 | (DE) . |
| 36 19 942 A1 | 12/1987 | (DE) . |
| 0 092 066 A1 | 10/1983 | (EP) . |
| 0 265 059 A1 | 4/1988 | (EP) . |
| 0 301 517 A2 | 2/1989 | (EP) . |
| 0 619 196 A1 | 10/1994 | (EP) . |
| 2 297 150 | 8/1976 | (FR) . |
| WO 91/06438 | 5/1991 | (WO) . |

* cited by examiner

*Primary Examiner*—Christopher P. Schwartz
(74) *Attorney, Agent, or Firm*—Connolly Bove Lodge & Hutz

(57) ABSTRACT

The present invention relates to a vehicle wheel suspension device comprising a shock absorber and a helical spring mounted between a lower spring retainer integral with the shock absorber cylinder, and an upper spring retainer integral with the shock absorber rod. The upper spring retainer is integral with a laminated elastomer assembly secured to a part to be fixed on the vehicle body. The part to be fixed to the vehicle body is angularly adjustable relative to the body.

20 Claims, 4 Drawing Sheets

VEHICLE WHEEL SUSPENSION DEVICE

BACKGROUND OF THE INVENTION

The invention relates to a suspension device for the wheel of a vehicle, comprising a shock absorber mounted between the hub carrier of the wheel and the body of the vehicle, and a coil spring mounted between a lower spring plate secured to the cylinder of the shock absorber and an upper spring plate mounted secured to the rod of the shock absorber.

In known devices of this kind, in particular, suspensions of the MacPherson type, a thrust ball bearing is mounted between the upper spring plate and the vehicle suspension tower. This thrust ball bearing exhibits, when the steering is turned, a threshold resistance to slip which makes the steering undesirably stiff.

SUMMARY OF THE INVENTION

A first object of the invention is to improve the suspension devices of the known type by eliminating the upper thrust ball bearing and replacing it with an elastic system, of which the operating torque is approximately proportional to the angle of pivoting.

A second object of the invention is to produce this elastic system in a modular form, so as to allow an interchangeable modular assembly comprising a shock absorber and an associated spring to be factory assembled.

A third object of the invention is to allow this interchangeable assembly to be torsionally preset once it has been assembled with the body of the vehicle, so as to compensate for any lateral loading due to the tire.

The subject of the invention is a suspension device for the wheel of a vehicle, comprising a shock absorber mounted between the hub carrier of the wheel and the body of the vehicle, and a coil spring mounted between a lower spring plate secured to the cylinder of the shock absorber and an upper spring plate mounted secured to the rod of the shock absorber, characterized in that the upper spring plate is secured to a laminated elastomeric assembly secured to a part for attaching to the body of the vehicle, preferably a suspension tower formed in the body of the vehicle, the part for attaching to the body being angularly adjustable with respect to the body.

According to other features of the invention:
the part for attachment to the body of the vehicle is shaped into a convex cup which fits to the interior surface of the suspension tower;
the upper end of the coil spring is angularly indexed by insertion in part of either the lower or upper spring plates, which part is advantageously overmolded with an elastomeric material, at least in the region in which the spring rests;
the part for attachment to the body is mounted so that it can pivot with respect to the i body via a lever for adjusting its rotation;
the attachment part and the body each have a number of orifices located on circles of the same diameter and spaced apart so as to allow angular indexing when the part for attachment to the body and the body are mechanically assembled;
the part for attachment to the body has a radially inner part collaborating with a relaxation stop to prevent the shock absorber from disengaging if the vehicle wheel lifts off the road surface and the laminated elastomeric assembly breaks;
the radially inner part is coated at least partially or overmolded with a shock-absorbing material;
the body has a number of first shapings and the part for attaching to the body has a number of second shapings, and a first shaping of the body collaborates with a second shaping of the part for attachment to the body so as to provide indexing between the body and the part for attachment to the body;
the part for attachment to the body is shaped to snap-fasten into the body.

BRIEF DESCRIPTION OF THE DRAWINGS

The invention will be better understood by virtue of the description which will follow, which is given by way of non-limiting example, with reference to the appended drawing.

In this drawing.

DETAILED DESCRIPTION OF THE INVENTION

Referring to FIGS. 1 to 8, the identical references denote elements which are identical or functionally equivalent.

Figure 1:
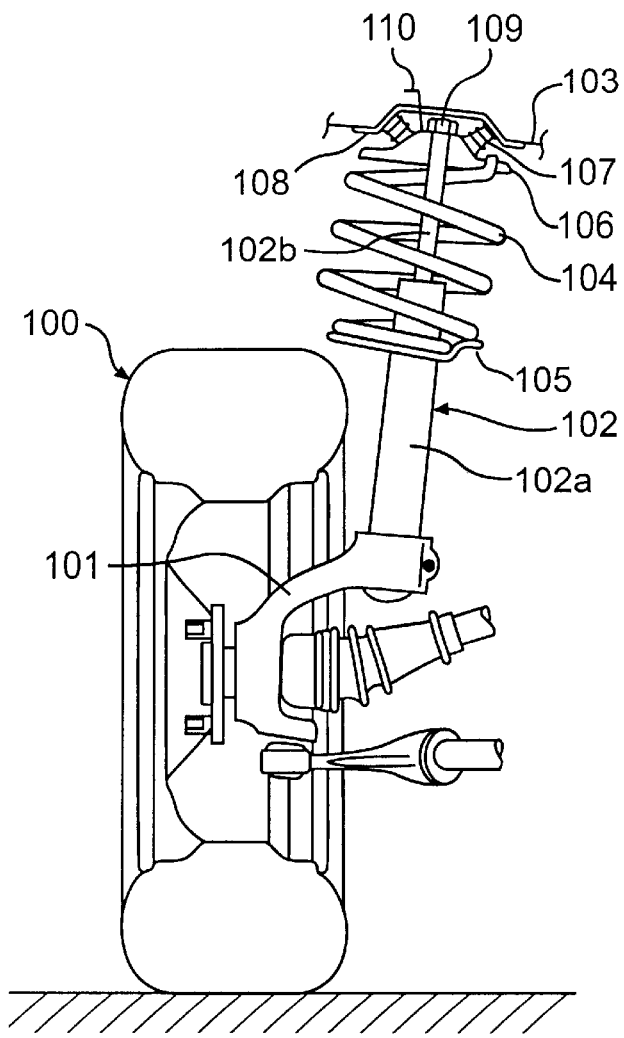
FIG. 1 diagrammatically depicts a view in vertical elevation with partial section of a suspension device according to the invention.
Figure 2:
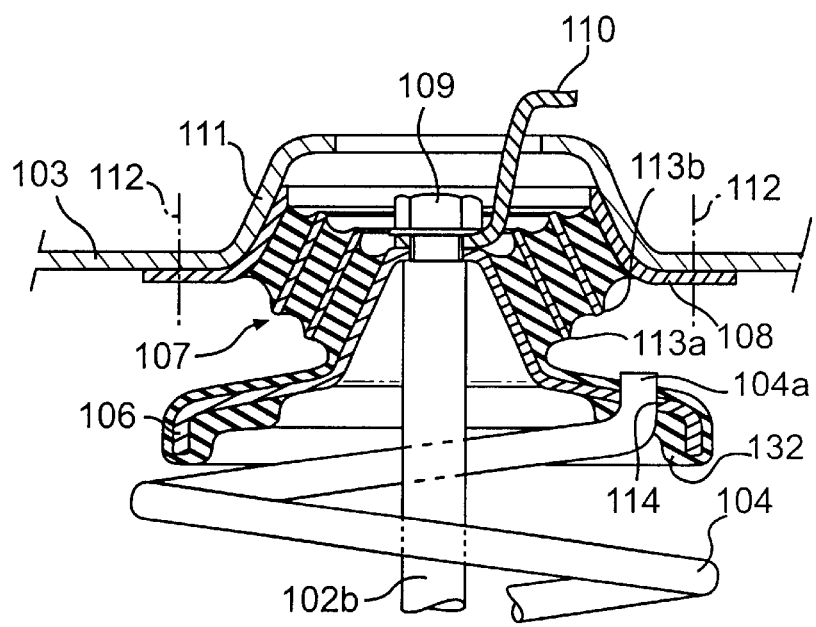
FIG. 2 diagrammatically depicts an enlarged part section view of a suspension device similar to the one in FIG. 1.

In FIG. 1, a wheel assembly 100 comprising a tire, a rim, and wheel bolts, is mounted on the hub of a hub carrier 101 of the vehicle. A shock absorber 102 is mounted between the hub carrier 101 and the body 103 of the vehicle. A coil spring 104 is mounted between a lower spring plate 105 secured to the cylinder 102*a* of the shock absorber 102 and an upper spring plate 106 mounted secured to the rod 102*b* of the shock absorber 102.

According to the invention, the upper spring plate 106 is secured to a laminated elastomeric assembly 107 itself secured to a part 108 for attaching to the body 103 of the vehicle.

In a known way, the nut 109 for attaching the rod 102*b* of the shock absorber to the upper spring plate 106 also holds in place a relaxation stop 110 which prevents the shock absorber from disengaging if the wheel of the vehicle lifts off the road surface and the laminated elastomeric assembly 107 breaks.

The body 103 of the vehicle is shaped to exhibit a suspension tower 111. The part 108 for attaching to the body 103 of the vehicle is advantageously shaped into a convex cup which fits the interior surface of the suspension tower 111. The part 108 is attached to the body 103 by mechanical assembly, bolts or screws depicted diagrammatically by center lines 112. The laminated elastomeric assembly 107 essentially consists of an elastomeric molding with a low torsional resistance with the interposition of thin metal cone frustums 113a, 113b between the layers of elastomer.

The laminated assembly obtained by overmolding with elastomer with a hardness of below 50 degrees Shore has low torsional strength over a wide range of turning angles. The effect of laminating this assembly is that the torsion angle that can be obtained is the sum of the torsion angles of each elastomer cone frustum interposed between the upper spring plate 106, the first cone frustum 113a, the second cone frustum 113b and the convex cup 108.

Advantageously, it is envisaged that the upper spring plate 106 is overmolded with overmolding 132 at least near the orifice 114 via which the end 104a of the spring 104 is engaged in the spring plate 106. This at least local overmolding makes it possible to avoid impact noise while at the same time fixing the end 104a of the coil spring 104 so that it is angularly indexed. To avoid needless overmolding work, the overmolding is preferably performed in a single operation, which also means that the upper surface of the spring plate 106 and most of its flared inside are also overmolded.

The invention described with reference to frustoconical parts 113a, 113b made of metal is not in any way restricted to this material but extends to other materials which can be overmolded and which have a stiffer torsional characteristic than the overmolding elastomer: mention may, in particular, be made of all textiles, nonwovens, thermoplastics or thermosets which can be overmolded. The essential thing is that the angularly deformable zones consisting of the overmolded elastomer parts be separated from the zones of torsional rigidity consisting of the intermediate cone frustums 113a, 113b.

Figure 3:
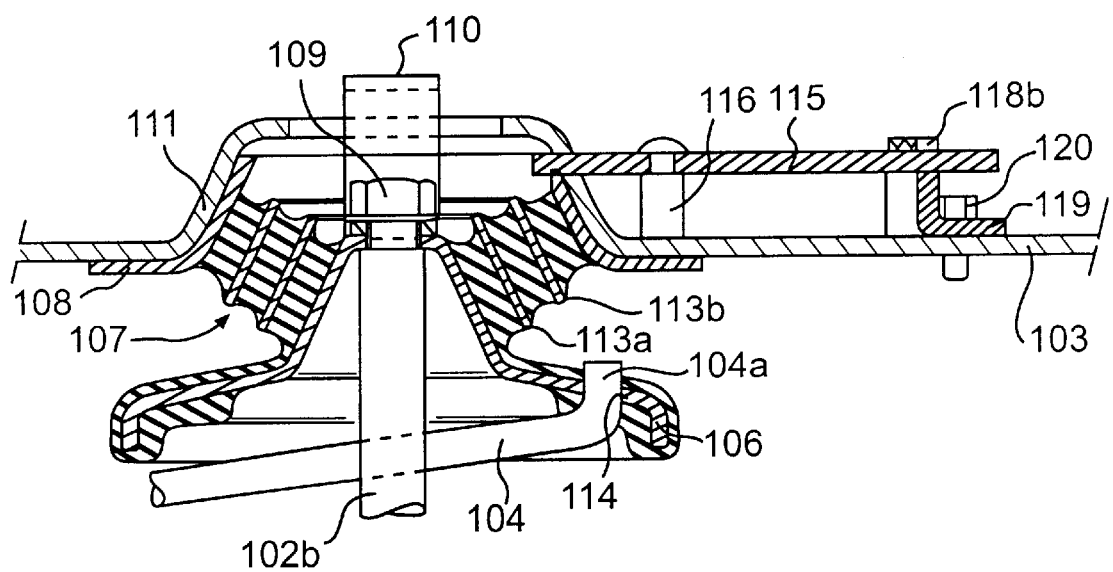
FIG. 3 diagrammatically depicts an enlarged view in section on the line III—III of FIG. 4 of a second alternative form of the invention.
Figure 4:
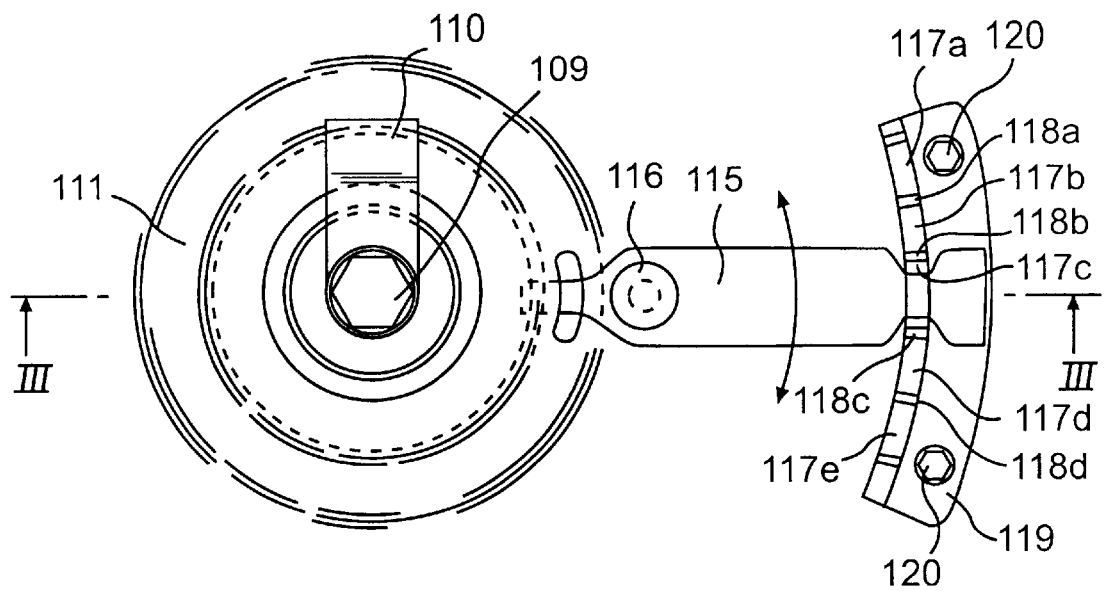
FIG. 4 diagrammatically depicts a view from above of the device of FIG. 3.

In FIGS. 3 and 4, the attachment part 108 is angularly adjustable with respect to the suspension tower 111 of the body 103. For this purpose, a lever 115 engaged in a cut-out at the upper end of the part 108 is mounted on a spindle 116 secured to the body 103; it is possible to envisage the interposition of an anti-friction material between the part 108 and the suspension tower 111. The opposite end of the lever 115 to the end which is welded to the part 108 is shaped to engage in recesses 117a to 117e separated by adjusting teeth 118a to 118d. The recesses 117 and the teeth 118 are made in a part 119, for example a bracket shaped into an arc of a circle, fixed to the body 103 by mechanical assembly (bolts, screws, spot-welding, etc.).

Figure 5:
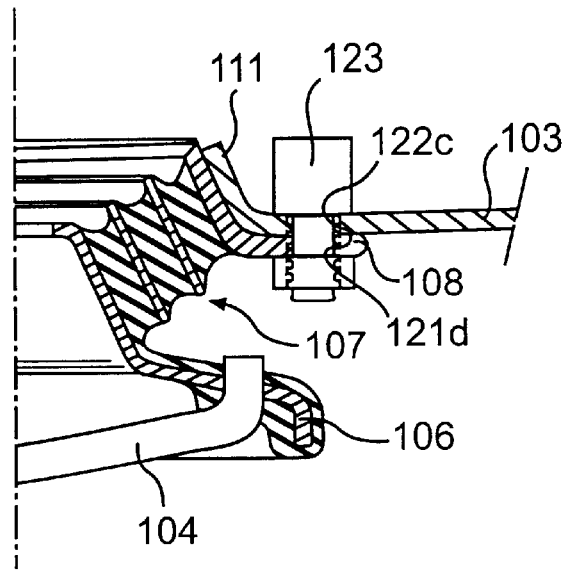
FIG. 5 diagrammatically depicts a half view in section on the line V—V of FIG. 6, of a third alternative form of the invention.
Figure 6:
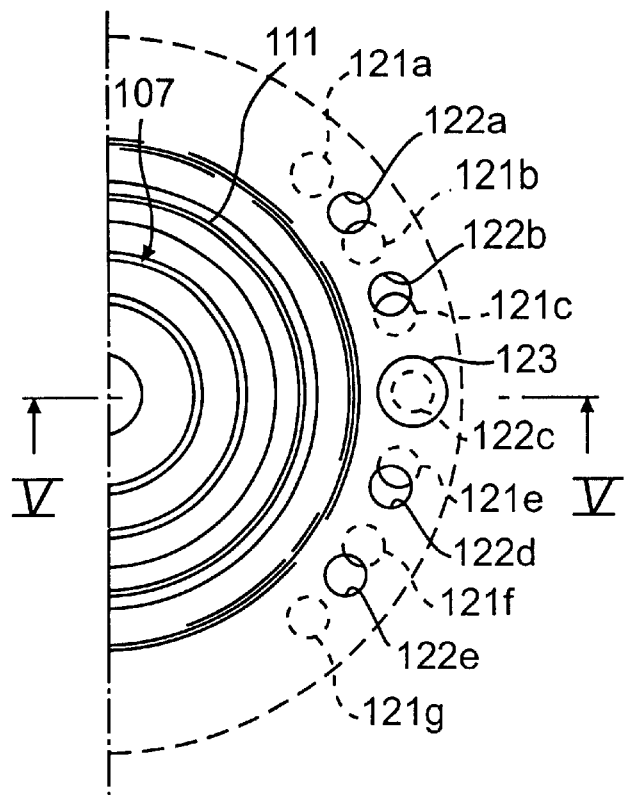
FIG. 6 diagrammatically depicts a half view from above of the device of FIG. 5.

In FIGS. 5 and 6, the part 108 for attachment to the suspension tower 11 of the body 103 has a number of orifices 121a to 121g. Near the suspension tower 111, the body 103 has a number of orifices 122a to 122e lying approximately on the same diameter as the orifices 121a to 121g. The orifices 121 are uniformly spaced with a spacing which differs from the uniform spacing of the orifices 122. The attachment part 108 can thus be adjusted with respect to the body 103 in the manner of a vernier scale, so as to precisely angularly index the attachment part 108 with respect to the body 103. Once this adjustment has been performed, the part 108 is mechanically assembled with the suspension tower 111, using an assembly screw or bolt 123.

The invention thus provides a means for torsionally adjusting the suspension, so as to at least partially compensate for sidepull or drift due to the tire.

Figure 7:
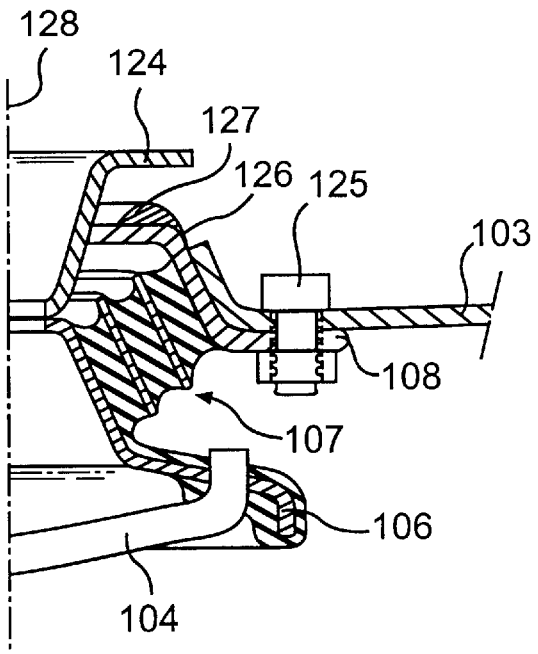
FIG. 7 diagrammatically depicts a half view in section of a fourth alternative form of the invention.

In FIG. 7, the upper spring plate 106 is assembled, by means of the shock absorber rod 104b and nut 109 (not depicted) with a relaxation stop 124 which advantageously has a shape which exhibits symmetry of revolution. The part 108 for attachment to the body 103 by means of the mechanical assembly 125 has a radially inner part 126 which collaborates with the bounce or relaxation stop 124 to prevent the shock absorber from becoming disengaged if the vehicle wheel lifts or lifts off the road surface.

The radially inner part 126 is advantageously coated or at least partially overmolded with an impact-resistant material, for example a polyamide. In the example depicted, the overmolding 127 is in an annular shape approximately coaxial with the axis of revolution 128.

This advantageous embodiment of the invention allows the shock absorber assembly comprising the relaxation stop 124, the radially inner part 126 of the attachment part 108, the laminated assembly 107, the upper spring plate 106, the shock absorber 102 and the spring 104 mounted on the lower spring plate 105 to be factory manufactured.

Figure 8:
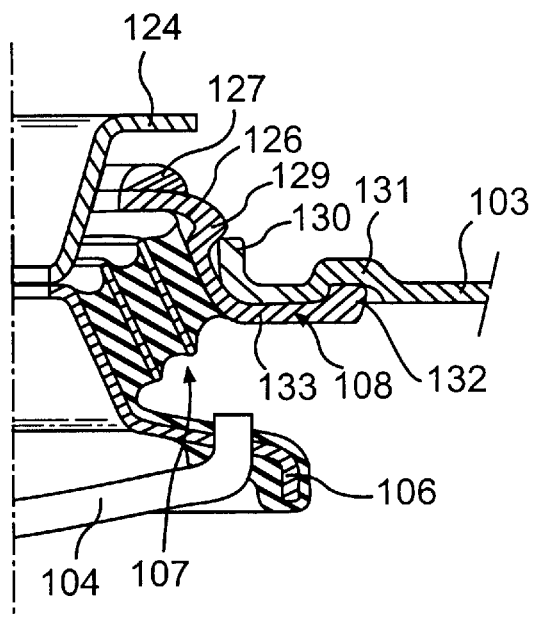
FIG. 8 diagrammatically depicts a half view in section of a fifth alternative form of the invention.

In FIG. 8, the attachment part 108 has an annular rim 129 designed to snap-fasten to the rim 130 of the body 103.

To provide indexing between the body 103 and the attachment part 108, the body 103 has a number of indentations 131 and the attachment part 108 is equipped with a number of bosses 132 mounted on flexible levers 133. The bosses 132 and the indentations 131 are spaced at different spacings, so as to provided precise indexing between the body 103 and the attachment part 108 through the engagement of a boss 132 in an indentation 131. Adjustment is in the manner of a vernier scale, in a similar way to that which was described with reference to FIG. 6.

Of course, the invention extends to the collaboration of any recessed shape with any raised shape, the shapes being respectively borne by the attachment part 108 and by the body 103.

The invention is not in way restricted to the alternative forms described hereinabove but extends to any device comprising a spring and a shock absorber comprising a laminated elastomeric assembly, the angle of rotation of which is approximately proportional to the torques supplied, without having any threshold and exhibiting an arrangement which allows a modular assembly comprising a shock absorber and associated spring, ready to be assembled directly with the body or suspension tower of the vehicle, to be factory manufactured.

What is claimed is:

1. A suspension device for a wheel of a vehicle, comprising a shock absorber mounted between a hub carrier of the wheel and a body of the vehicle, and a coil spring mounted between a lower spring plate secured to a cylinder of the shock absorber and an upper spring plate mounted secured to a rod of the shock absorber, characterized in that the upper spring plate is secured to a laminated elastomeric assembly secured to a part for attaching to the body of the vehicle, said part for attaching to the body being angularly adjustable with respect to the body.

2. A device according to claim 1, characterized in that an upper end of the coil spring is angularly indexed by insertion in part of either the lower or upper spring plates, said part being overmolded with an elastomeric material.

3. A device according to claim 2, characterized in that the attachment part and the body each have a number of orifices which lie on one and the same diameter and are spaced apart so as to allow angular indexing when the part for attachment to the body and the body are mechanically assembled.

4. A device according to claim 3, wherein the part for attachment to the body has a radially inner part collaborating with a relaxation stop to prevent the shock absorber from disengaging if the vehicle wheel lifts off the road surface and the laminated elastomeric assembly breaks.

5. A device according to claim 3, wherein the part for attachment to the body is shaped to snap-fasten into the body.

6. A device according to claim 2, characterized in that the attachment part is mounted so that it can pivot with respect to the body via a lever for adjusting its rotation.

7. A device according to claim 6, wherein the part for attachment to the body has a radially inner part collaborating with a relaxation stop to prevent the shock absorber from disengaging if the vehicle wheel lifts off the road surface and the laminated elastomeric assembly breaks.

8. A device according to claim 6, wherein the part for attachment to the body is shaped to snap-fasten into the body.

9. A device according to claim 2, characterized in that the body has a number of first shapings and the part for attachment to the body has a number of second shapings, and in that, so as to provide indexing between the body and the part for attachment to the body, a first shaping of the body collaborates with a second shaping of the part for attachment to the body.

10. A device according to claim 2, wherein the part for attachment to the body has a radially inner part collaborating with a relaxation stop to prevent a shock absorber from disengaging if the vehicle wheel lifts off the road surface and the laminated elastomeric assembly breaks.

11. A device according to claim 2, wherein the part for attachment to the body is shaped to snap-fasten into the body.

12. A device according to claim 1, characterized in that the part for attachment to the body of the vehicle is shaped into a convex cup so that it fits the interior surface of a suspension tower formed in the body.

13. A device according to claim 12, wherein the upper end of the coil spring is angularly indexed by insertion in part of either lower or upper spring plates, the said part being overmolded with an elastomeric material.

14. A device according to claim 12, wherein the part for attachment to the body has a radially inner part collaborating with a relaxation stop to prevent the shock absorber from disengaging if the vehicle wheel lifts off the road surface and the laminated elastomeric assembly breaks.

15. A device according to claim 12, wherein the part for attachment to the body is shaped to snap-fasten into the body.

16. A device according to claim 1, characterized in that the part for attachment to the body has a radially inner part collaborating with a relaxation stop to prevent the shock absorber from disengaging if the vehicle wheel lifts off the road surface and the laminated elastomeric assembly breaks.

17. A device according to claim 16, characterized in that the radially inner part is coated at least partially or overmolded with a shock-absorbing material.

18. A device according to claim 17, wherein the part for attachment to the body is shaped to snap-fasten into the body.

19. A device according to claim 16, wherein the part for attachment to the body is shaped to snap-fasten into the body.

20. A device according to claim 1, characterized in that the part for attachment to the body is shaped to snap-fasten into the body.

* * * * *